(No Model.)
C. JACKSON.
Fountain for Soda and Mineral Waters.
No. 238,909. Patented March 15, 1881.
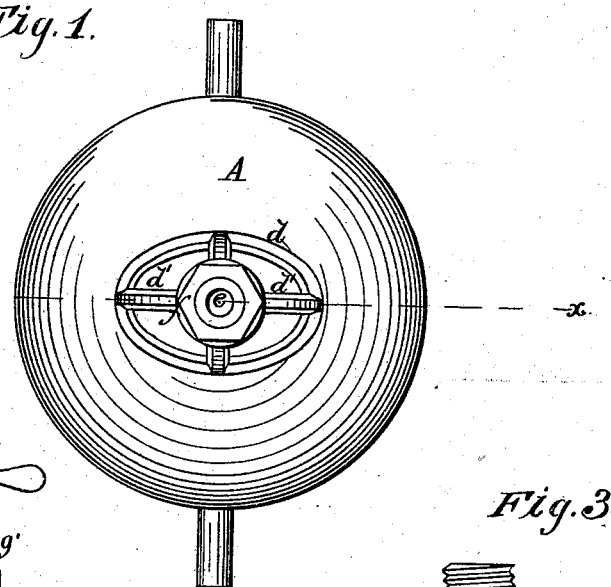
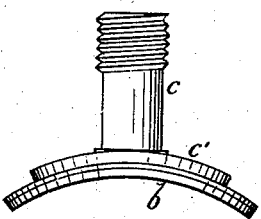
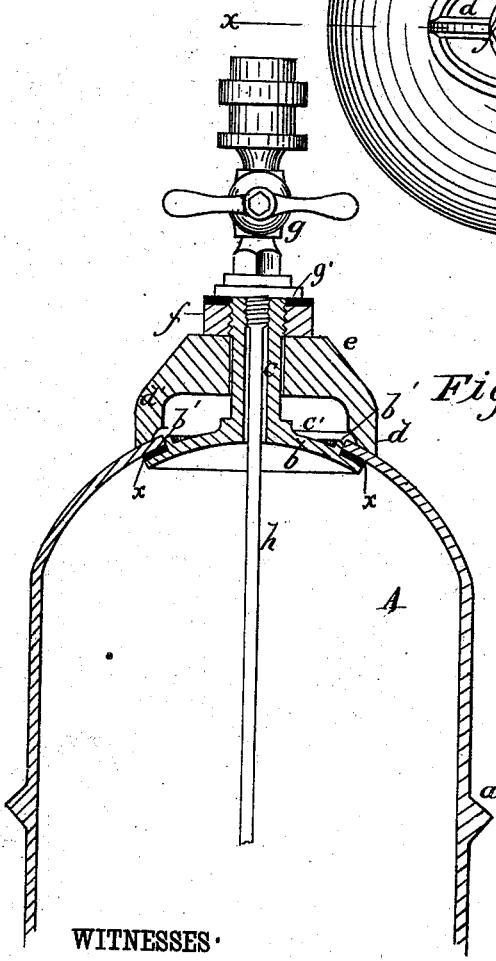
WITNESSES
Henry N. Miller
C. Sedgwick
INVENTOR:
C. Jackson
BY [signature]
ATTORNEYS.

UNITED STATES PATENT OFFICE.

CHARLES JACKSON, OF NEW BEDFORD, MASSACHUSETTS.

FOUNTAIN FOR SODA AND MINERAL WATERS.

SPECIFICATION forming part of Letters Patent No. 238,909, dated March 15, 1881.

Application filed May 10, 1880. (No model.)

*To all whom it may concern:*

Be it known that I, CHARLES JACKSON, of New Bedford, in the county of Bristol and State of Massachusetts, have invented a new and useful Improvement in Fountains for Soda and Mineral Waters, of which the following is a specification.

Soda and mineral water fountains have heretofore been made of copper, with the inner surface tinned, to prevent the copper from injuring or discoloring the liquid in the fountains. Retinning of such fountains is frequently required, and is a matter of considerable trouble and expense, as the joint connecting the two parts of the fountain must be unsoldered to give access to the inner side, and to facilitate such work the joints have usually been made with soft-solder.

The objects of my invention are to permit connection of the two parts of the fountain by a brazed joint, whereby strength and security against leakage are obtained; to permit inspection of the interior of the fountain; to permit of their being readily washed out and retinned without separating the joints.

My invention consists in a removable cap or plate for receiving the cock or valve-plug of the fountain.

In the accompanying drawings, forming part of this specification, I have shown a fountain constructed in accordance with my invention.

Figure 1 is an end view. Fig. 2 is a longitudinal section, and Fig. 3 is a side elevation of the removable plate.

Similar letters of reference indicate corresponding parts.

A is the metal fountain or carboy, made in usual shape, in two portions, tinned on the inner surface, and united together by brazing at the joint *a*. In one end of the fountain is formed an aperture or hand-hole of convenient size and shape for giving access to the interior, which aperture is closed by the plate *b*, that is held in place as next described.

Upon the upper side of plate *b* is formed a tubular spindle, *c*, having an interior and exterior screw-thread, and plate *b* is also formed with a raised flange, *b'*, for entering the aperture to retain the plate concentric therewith.

*d* is a ring of suitable size for resting upon the fountain at the edges of the aperture, and formed with curved cross-bars *d'*, that sustain an apertured central hub, *e*, through which the spindle *c* projects when the parts are in place.

*f* is a nut upon the exterior thread of spindle *c*, and bearing on hub *e*.

*g* is the usual cock or valve, fitted with tube *h*, that enters the fountain through the aperture of spindle *c*, and formed with a thread, that engages the interior thread of the spindle, for retaining the cock in place. The cock is also formed with a flange, *g'*, that bears upon a washer between itself and the nut *f*.

To close the aperture of the fountain, the cap *b* is first held in place with its rim beneath the edges of the aperture. The aperture being oval, this may be readily done, and the ring *d* is then placed upon the fountain, and the nut *f* placed on spindle *c* and screwed down tightly upon hub *e*. The edges of the aperture are thus clamped tightly between plate *b* and ring *d*, and to make a tight joint a rubber gasket will be applied upon the plate *b*, as shown. The cock *g* may then be screwed to place for use, as usual.

By removal of plate *b* the interior of the fountain may be inspected, the fountain easily washed out, and if retinning is required the aperture is sufficiently large for the operation. There is therefore no necessity of taking the fountain apart at the joints, and the joints may be permanently brazed.

Having thus described my invention, I claim as new and desire to secure by Letters Patent—

The combination, with the cap-plate *b*, having tube *c*, to connect with cock, and the raised flange *b'*, of the ring *d*, having cross-bars *d'*, the central hub, *e*, and the nut *f*, as shown and described.

CHARLES JACKSON.

Witnesses:
SIMEON N. WEST,
SOUTHWARD POTTER, 2d.